United States Patent
Seth

(10) Patent No.: US 6,645,611 B2
(45) Date of Patent: *Nov. 11, 2003

(54) DISPENSABLE OIL ABSORBING SKIN WIPES

(75) Inventor: Jayshree Seth, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 109 days.

This patent is subject to a terminal disclaimer.

(21) Appl. No.: 09/780,094

(22) Filed: Feb. 9, 2001

(65) Prior Publication Data

US 2002/0110655 A1 Aug. 15, 2002

(51) Int. Cl.$^7$ .............................. A47K 7/02; A47K 7/03
(52) U.S. Cl. ................... 428/311.11; 428/359; 428/397
(58) Field of Search ................... 428/304.4, 311.11, 428/359, 397

(56) References Cited

U.S. PATENT DOCUMENTS

| | | | |
|---|---|---|---|
| 1,205,892 A | 11/1916 | Hecht | |
| 2,032,150 A | 2/1936 | Richardson | 206/57 |
| 2,269,525 A | 1/1942 | Fleischer | 206/57 |

(List continued on next page.)

FOREIGN PATENT DOCUMENTS

| | | |
|---|---|---|
| EP | 0 821 153 B1 | 1/1998 |
| EP | 1066826 | 1/2001 |
| GB | 2061709 | 5/1981 |
| JP | 56-8606 | 1/1981 |
| JP | 58-74894 | 5/1983 |
| JP | 4-045591 | 2/1992 |
| JP | 5-18392 | 1/1993 |
| JP | H06-25277 | 4/1994 |
| JP | 6-319664 | 11/1994 |
| JP | H10-15304 | 1/1998 |
| WO | WO 9318988 A1 | 9/1993 |
| WO | WO 99/29220 | 6/1999 |
| WO | WO 01/85001 | 11/2001 |

OTHER PUBLICATIONS

Wente Van A., "Superfine Thermoplastic Fibers", *Industrial Engineering Chemistry*, vol. 48, p. 1342 et seq. (1956).
Wente et al., "Manufacture of Superfine Organic Fibers", Report No. 4364 of the Naval Research Laboratories, published May 25, 1954.
U.S. application Ser. No. 09/566,308 (3M Ref: 54943USA2A.002).
U.S. application Ser. No. 09/585,649 (3M Ref: 55601USlA2A.002).
U.S. application Ser. No. 09/582,838 (3M Ref: 53859USA2.008).

*Primary Examiner*—Sandra M. Nolan
(74) *Attorney, Agent, or Firm*—Gary L. Griswold; Robert W. Sprague; William J. Bond

(57) ABSTRACT

There is provided a package of multiple oil absorbing wipes suitable for wiping a users skin or hair. The wipes are arranged in an overlying arrangement and comprise an oil absorbing porous film-like substrate of a thermoplastic material having a transparency of less than 65 percent. The porous substrate changes transparency by at least 10 percentage points when loaded with oil. The porous substrate has an embossing pattern over from 1 to 50 percent of at least a portion of the of the wipe material surface area, which area is in contact with an adjacent wipe in the package.

34 Claims, 3 Drawing Sheets

U.S. PATENT DOCUMENTS

| | | | |
|---|---|---|---|
| 2,341,794 A | 2/1944 | Kliwer | 206/57 |
| 2,885,112 A | 5/1959 | Willat | 221/33 |
| 3,825,379 A | 7/1974 | Lohkamp et al. | 425/72 |
| 3,971,373 A | 7/1976 | Braun | 128/146.2 |
| 4,279,890 A | 7/1981 | Harris et al. | 424/69 |
| 4,532,937 A | 8/1985 | Miller | 128/759 |
| 4,574,952 A | 3/1986 | Masui et al. | 206/494 |
| 4,587,154 A | 5/1986 | Hotchkiss et al. | 428/195 |
| 4,643,939 A | 2/1987 | Sugiyama et al. | 428/283 |
| 4,726,989 A | 2/1988 | Mrozinski | 428/315.5 |
| 4,739,902 A | 4/1988 | Joslyn et al. | 221/37 |
| 4,755,178 A | 7/1988 | Insley et al. | 604/367 |
| 4,818,463 A | 4/1989 | Buehning | 264/40.1 |
| 4,907,174 A | 3/1990 | Priem | 364/521 |
| 4,986,743 A | 1/1991 | Buehning | 425/7 |
| 5,046,640 A | 9/1991 | Carroll | 221/213 |
| 5,119,828 A | 6/1992 | Miller | 128/760 |
| 5,144,744 A | 9/1992 | Campagnoli | 29/446 |
| 5,184,725 A | 2/1993 | Reinheimer | 206/494 |
| 5,647,506 A | 7/1997 | Julius | 221/46 |
| 5,744,149 A | 4/1998 | Girardot | 424/402 |
| 5,935,521 A | 8/1999 | Khazaka | 422/61 |
| 6,036,909 A * | 3/2000 | Baum | 264/280 |
| 6,214,362 B1 | 4/2001 | Page | 424/402 |
| 6,331,343 B1 * | 12/2001 | Perez et al. | 428/141 |
| 6,420,024 B1 * | 7/2002 | Perez et al. | 428/359 |

\* cited by examiner

DISPENSABLE OIL ABSORBING SKIN WIPES

BACKGROUND OF THE INVENTION

This invention relates to oil absorbent skin wipe products. The invention particularly relates to dispensable packages of oil absorbent skin wiping products.

A significant amount of oil continuously oozes out of the skin of the face, particularly the nose, cheek and forehead. To maintain cleanliness, reduce shine and to improve the spreadability of cosmetics and other skin products it is important to remove any excess surface oil or sebum. Soap and water work to some extent but there are always times when one is not able to wash. Dry methods of removing these facial oils include the use of thin oil absorbent wipe materials. Oil absorbing wipes for removing facial oil have also been described in the art. These wipes generally must be thin, conformable and non-abrasive, considerations not relevant to industrial oil absorbent materials.

Conventional paper type wipes have been used to remove facial oil. For example, natural or synthetic papers using vegetable fibers, synthetic pulp or kenaf have been used. These oil absorbent papers however are often irritating to the skin due to the hard and stiff nature of the fibers. To improve their smoothness, these papers have been continuously calendered and/or coated with powders such as calcium carbonate and sizing agents. Calendering however is not necessarily permanent and surface fibers can reform into a rough surface unless substantial amounts of binder or sizing agents are used, which decrease oil absorption. Paper wipes are also poor indicators as to their effectiveness, as papers generally do not significantly change appearance when they have absorbed oil or sebum.

Improvements to oil absorbing papers are described in Japanese Kokai No. 4-45591 which teaches adhering porous spherical beads onto the surface of an oil absorbing paper so as to solve the problems caused by calendering or coating of paper with powders such as calcium carbonate powders. These beads also are used to allegedly increase the capacity of the papers to absorb sebum. Japanese Unexamined Patent Publication (Kokai) No. 6-319664 discloses a high-density oil absorbing paper produced by mixing (a) a pulp material containing vegetable fibers, as the main component with (b) an inorganic filler, followed by paper-making to form a paper with a basis weight of 0.7 g/cm$^2$ or more. However, the oil absorbing papers disclosed in these patent publications still have a limited capacity to absorb oil or sebum and little indicating function as there is little change in opacity or color in the paper when oil is absorbed. Difficulty in confirming oil removal means that users of the oil clearing paper can not evaluate if or how much sebum is removed from the users' face when using the oil absorbing paper such that makeup and the like can be applied with confidence.

An oil absorbing paper for sebum is also disclosed in Japanese Examined Patent Publication (Kokoku) No. 56-8606, or U.S. Pat. No. 4,643,939, which describes a cosmetic oil absorbing paper produced by mixing hemp fibers with 10 to 70% by weight of polyolefin resin fibers and making a paper with a basis weight of from 12 to 50 g/cm$^2$. This paper will allegedly clear upon absorption of oil but still requires conventional papermaking techniques and would be rough to the touch. Japanese Unexamined Utility Model Publication (Kokai) No. 5-18392, discloses an oil absorbing synthetic paper comprising an oil absorbing paper with a smooth surface coating of inorganic or organic powder material such as clay particles, silica fine-particles, and powdered fibers. These oil-absorbing papers allegedly have some oil indicating effect by clarifying the paper upon oil absorption thus confirming oil absorption. However, the powder coating lowers the oil absorption capacity for these papers and it is still difficult to attain a clear change in the appearance of this type of oil clearing paper after oil absorption.

Japanese Unexamined Patent Publication (Kokai) No. 9-335451 (WO99/29220) discloses an oil wipe made of a porous thermoplastic film. This oil absorbing wipe film has higher oil absorption capacity than the oil absorbing papers and is also superior in confirming removal of oil following wiping as compared to oil absorbing papers. It is believed that the reason for this good oil removal indicating functionality is that these porous thermoplastic films exhibit low light transmittance before oil absorption because of irregular reflection of light, but the light transmittance increases substantially after the micro-pores of the film are filled with oils producing a large change in the film's opacity or light transmittance, and therefore appearance. This change in opacity clearly confirms to the user the removal of oil or sebum from his or her skin. Further, unlike the paper products, these film based wipes are soft, comfortable, smooth and nonirritating to the skin. However, it has been found to be a problem to individually dispense these film-based wipes from a package where they are stacked in a dispensable form.

It is an object of the invention to form an oil absorbing wipe having a clear oil indicating function, such as described in WO99/29220, which is easily dispensable from a package, which product is easy to directly manufacture and is smooth and nonirritating to the skin.

BRIEF SUMMARY OF THE INVENTION

The invention is directed to a package of multiple oil absorbing wipe materials suitable for wiping a users' skin or hair. The multiple wipes are arranged in an overlying arrangement and the individual wipes comprise at least an oil absorbing porous film-like substrate of a thermoplastic material. Generally, the wipe has an initial transparency of about 65 or less, which porous substrate changes transparency by at least 10 (as defined herein) when loaded with oil. Further, the wipe porous substrate has an embossing pattern over from 1 to 50 percent of the wipe material surface. The embossing pattern has a greater transparency than the unembossed areas of the wipe and preferably has a transparency similar to the oil filled wipe.

DETAILED DESCRIPTION

The invention is generally directed at a dispensable package of oil absorbing wipes of a filmlike thermoplastic porous material. The individual wipes are in the package in a stacked arrangement. By stacked it is meant that a face of one wipe will be over all, or substantial portion of one face, in continuous contact with all, or a substantial portion of, a face on an adjacent wipe in the package. Generally, the package will contain at least 2 or more individual wipes, preferably 10 to 1000.

Figure 1:
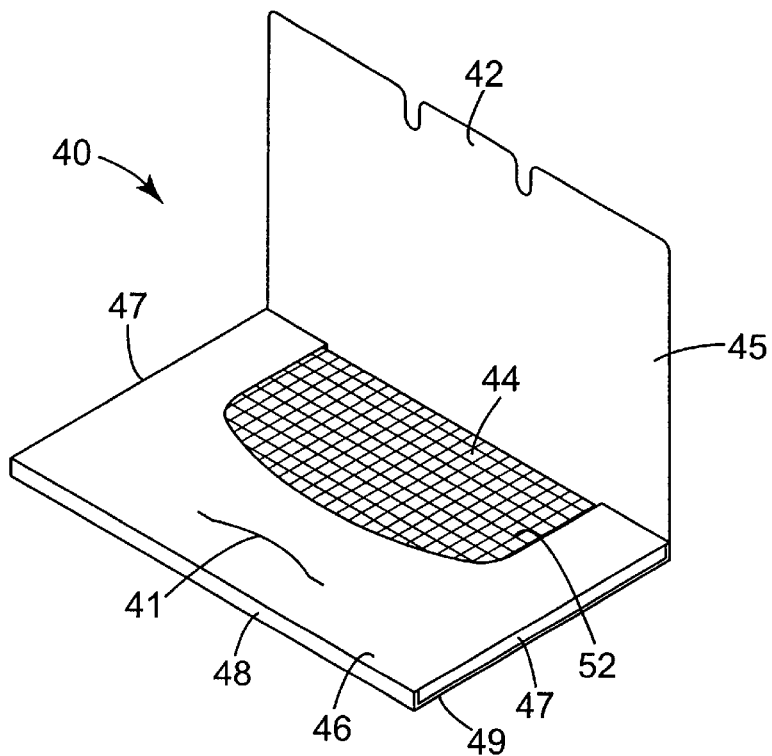
FIG. 1 is a perspective view of a dispensable package of oil absorbing wipes.

Referring to FIG. 1, a dispensable package of oil wipes in accordance with the invention comprises a dispensable package 40 including individual wipes 44 of oil absorbent wipe material. The package 40 generally comprises a top wall 46 and bottom wall 49, generally parallel to one another, and two side walls 47. A front edge 48 is provided where the back edge is formed into a flap 45, which can be folded down onto the upper face 46 of the package 40. The flap 45 can engage with the package 40 by use of an adhesive or the like, provided as is known in the art. Alternatively, a tab 42 engageable within a slot 41 can be used as a macro-mechanical type closure. Other conventional methods known in the art include the use of cohesive materials, hook and loop fasteners, living hinges, snaps and the like to keep the flap 45 in place to cover the access opening 52 to the wipes. The dispensable package 40 contains an access opening 52 which permits a user to grasp an individual wipe and withdraw it from the package 40 for use. Generally, the access opening 52 is at its largest dimension, smaller than the largest length or width dimension of the dispensable oil absorbing wipe material or wipe.

Figure 5:
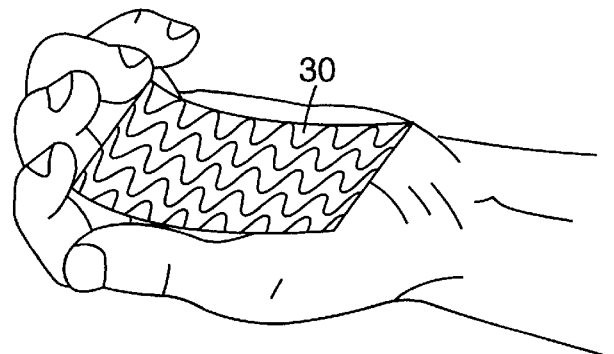
FIG. 5 is a perspective view of an invention wipe in use.
Figure 6:
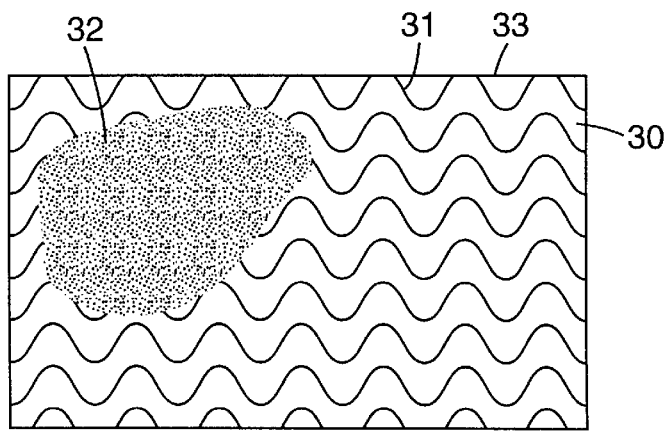
FIG. 6 is a perspective view of an invention wipe after it has been used.

The individual oil absorbing wipes of the invention are provided with an embossing pattern. The embossed areas collapse, at least partially, the porous structure of the thermoplastic wipe material. This embossing increases the transparency of the wipe in the embossed areas. The overall effect is a visible pattern where the embossed areas are below the plane of the wipe face formed by the unembossed areas, for example 5 to 50μ below the wipe outer face. This reduces the overall surface contact of a wipe relative to an overlying or underlying wipe in the package. This reduced surface contact between adjacent wipes increases the dispensability of the wipes in a package by decreasing the bond level between the wipes. This is particularly effective where the wipe is or rendered hydrophilic. The patterned embossing also reduces a wipe's rigidity, improving the texture and feel of the wipe. The embossing pattern's increased transparency also provides a visual reference as to what the wipe should appear like following oil absorption. As shown in FIGS. 5 and 6, where the wipe 30 has embossing elements 31 which are relatively transparent compared to nonembossed areas 33. the portion used 32 to absorb oil, after use resembles the embossed areas 31 (i.e., they have the same or similar levels of transparency).

The embossing pattern can be continuous and/or connected embossing elements such as a grid, connected lines or random connected patterns or the like. This has the advantage of the patterns would extend to the edges of the wipes, which substantially improves dispensability. Alternatively, the embossing pattern could be discrete elements such as dots, disconnected patterns or the like. The embossing pattern can be formed by conventional techniques over from 1 to 50% of the surface area of the wipe, preferably 2 to 25% of the wipe surface area, at least in that portion of the wipe outer face that is in continuous contact with an adjacent wipe in a package. The individual embossing elements of the embossing pattern are generally from 0.1 to 10 mm wide at their narrowest dimension, preferably 0.2 to 5. Too wide an embossing element would reduce the oil absorbing ability of the wipe. Too small an embossing element is difficult to see and would not significantly increase dispensability. In general, embossing will take place at a pressure in the range of from about 50 pli to about 500 pli. This provides an embossed area with a transparency at least 30 percentage points more than the nonembossed areas of the wipe, preferably at least 35 percentage point more than the nonembossed areas of the wipe. For a different bond area, the preferred pressure may be obtained by multiplying by the ratio of % areas to maintain constant psi on an individual bond point. The temperature of the embossing device will generally be in the range of from about 40° C. to 170° C.

The oil absorbent wipe is a porous filmlike thermoplastic material; in a first preferred embodiment it is a porous stretched or oriented film made of a thermoplastic material; or alternatively in a second preferred embodiment a consolidated porous thermoplastic microfiber nonwoven web which is filmlike. Filmlike as used herein is defined as thermoplastic films or consolidated nonwovens of thermoplastic fibers. The porous thermoplastic material can be coated on at least a portion of one face with an active agent. The wipe, whether used as is or with a coating, is preferably in a dry state, not wet, when used.

The porosity of the interstitial volume per unit area of the first embodiment porous film material is preferably in the range of 0.0001–0.005 cm³ as calculated by the equation:

Interstitial volume per unit area=[film thickness (cm)×1 (cm)×1 (cm)×void content (%)]/100 (where the void content is the percentage of voids in the porous film).

The "void content" is more specifically defined as the percentage of an amount of filling material, when all of the voids of the porous film are filled with a material of the same composition as the film, with respect to a film with no corresponding voids. The void content of the porous film is preferably in the range of 5–50% and the thickness is preferably in the range of 5–200 μm.

The porous stretched film may be produced by various different methods using a thermoplastic material as the starting substance. In one preferred method, the film is produced by adding a filler to a transparent crystalline thermoplastic resin, forming a film using conventional methods such as blown extrusion or casting, and then stretching the film to create fine voids therein. A porous stretched thermoplastic film obtained in this manner has a large percentage of voids constituting the volume of the wipe compared to conventional paper oil cleaning wipes, and has excellent absorption of skin oils per unit area. Also, since the thermoplastic film has a structure with a uniform distribution of many fine voids, prior to wiping of skin oils from the skin surface it appears non-transparent due to light dispersion by the pore structures. However, after oil absorption the oils fill the voids or pores thus either preventing or reducing the degree of light dispersion. This together with the original opaque or transparent nature of the thermoplastic forming the film allows the oil absorbing effect to be clearly assessed by a change in transparency or opacity.

Examples of transparent crystalline thermoplastic resins which can be used as the film forming material for production of the porous stretched thermoplastic film include, but are not limited to, polyethylene, polypropylene, polybutylene, poly-4-methylpentene and ethylene-propylene block copolymer.

Examples of preferred nonparticulate fillers that can be used in combination with the aforementioned thermoplastic resins to provide the fine voids include, but are not limited to, mineral oils, petroleum jelly, low molecular weight polyethylene, soft Carbowax and mixtures thereof. These nonparticulate fillers are preferred as they exhibit transparency upon absorption of oil. Mineral oils are preferred among these fillers because of their relatively low cost. However, additionally conventional particulate based fillers can also be used to form the porous film, such as talc, calcium carbonate, titanium dioxide, barium sulfate, etc.

The aforementioned fillers can be varied within a wide range within the starting thermoplastic resin used for production of the film. The amount of filler used is preferably in the range of 20–60% by weight, and more preferably 25–40% by weight of the starting thermoplastic material. If the amount of filler added to the starting material is under 20% by weight, the void content of the film resulting after stretching is reduced, thus lowering the amount of oil absorption, while if it is above 60% by weight it becomes more difficult to produce flexible coherent films.

Other additives may also be added as necessary in addition to the thermoplastic resin and filler in the production of the porous stretched thermoplastic film. For example, organic acids such as carboxylic acid, sulfonic acid and phosphonic acid, and organic alcohols. As additional suitable additives there may also be mentioned, for example, inorganic and organic pigment, aromatic agents, surfactants, antistatic agents, nucleating agents and the like. In a preferred embodiment, the wipe can be made hydrophilic by suitable melt additives on a coating or surface treatment.

The main starting materials and optional additives are melted and/or combined to form a film, producing a filler-containing thermoplastic film. The melting and mixing step (s) and the subsequent film forming step may be carried out according to known methods. An example of a suitable melt mixing method is kneading with a kneader, and examples of suitable film forming methods are the blown film method and the casting method. The blown film method, for example, can give tube-shaped films by melt mixing the main starting material, etc. and then blowing it up from a circular die. The casting method can give films by melt mixing the main starting material, etc. and then extruding it from a die onto a smooth or patterned chilled roll (cold roll). In a modified form of this casting method, the nonparticulate additives and/or fillers may be removed by washing off or extracting with a suitable solvent after extrusion of the melted mixture onto the chilled roll.

The formed thermoplastic film is then stretched to provide it with fine voids. As with the film forming, the stretching may also be carried out according to known methods, such as uniaxial stretching or biaxial stretching. For example, in the case of biaxial stretching, the stretching in the lengthwise direction may be accomplished by varying the speed of the driving roll, and the stretching in the widthwise direction may be accomplished by mechanical pulling in the widthwise direction while holding both ends of the film with clips or clamps.

The conditions for the film stretching are not particularly restricted, but the stretching is preferably carried out so as to give a void content in the range of 5–50% and a stretched film thickness in the range of 5–200 $\mu$m. If the void content upon stretching of the film is under 5% the amount of oil absorption will be reduced, while if it is over 50% the amount of oil absorption will be too great, making it difficult to clearly assess the oil absorbing effect. Also, if the film thickness is under 5 $\mu$m the amount of oil absorption capacity will be too low and the film will tend to adhere to the face making it more difficult to handle, while if it is over 200 $\mu$m the amount of oil absorption capacity will be too great and the film may feel stiff and harsh against the user's skin.

The stretching ratio for the thermoplastic film is usually preferred to be in the range of 1.5 to 3.0. If the stretching ratio is under 1.5 it becomes difficult to achieve a sufficient void content for oil absorption, while if it is over 3.0 the void content could become too large, causing too much oil absorption.

The average size of the voids formed by stretching of the film is usually preferred to be in the range of 0.2 to 5 $\mu$m. If the void size is under 0.2 $\mu$m it becomes impossible to rapidly absorb enough skin oil to create a clear change in transparency, while if it is over 5 $\mu$m the amount of oil absorption needed to permit a visible change in transparency may be too great.

As mentioned above, the interstitial volume per unit area of the porous stretched thermoplastic film obtained by the stretching process described earlier is preferably in the range of 0.0001–0.005 $cm^3$, and more preferably in the range of 0.0002–0.001 $cm^3$, as calculated by the equation defined above. If the interstitial volume of the film is under 0.001 $cm^3$ it becomes difficult for the user to hold the oil cleaning wipe, while if it is over 0.005 $cm^3$ the amount of oil absorption is too great, and it becomes difficult to clearly assess the oil absorbing effect.

The second embodiment of a thermoplastic filmlike porous wipe in the invention is a consolidated web formed of thermoplastic microfibers. A representative apparatus useful for preparing such a web or wipe product is shown schematically in FIG. 2. Part of the apparatus for forming blown fibers is described in Wente Van A., "Superfine Thermoplastic Fibers" in *Industrial Engineering Chemistry*, Vol. 48, p. 1342 et seq. (1956), or in Report No. 4364 of the Naval Research Laboratories, published May 25, 1954, entitled "Manufacture of Superfine Organic Fibers", by Wente, V. A.; Boone, C. D.; and Fluharty, E. L. Modifications to this basic design are discussed in U.S. Pat. Nos. 4,818,463; 3,825,379; 4,907,174 and 4,986,743. This portion of the illustrated apparatus comprises a die 10, which has a set of aligned side-by-side parallel die orifices 14. The die orifices 14 open from a central die cavity. Typically, the diameter of the orifices will be on the order of from about 250 microns to about 500 microns. From about 2 to about 20 such orifices will be provided per linear centimeter of die face. Typically, the length of the orifices will be from about 1 mm to about 5 mm. The polymer is introduced to the die orifices 14 and the central die cavity from a melt extruder 13 having a resin hopper 3, a barrel 5, and a screw 7 inside the barrel 5. The molten polyolefin resin exits from the extruder barrel 5 into a gear melt pump 9 which permits improved control over the flow of the molten polymer through the downstream components of the apparatus. Upon exiting from the pump 9, the molten resin flows into a die 10 containing the die cavity through which liquefied fiber-forming material is advanced. The fiber forming thermoplastic polymer is extruded from the die orifices 14 into an attenuating airstream of heated air. This attenuating airstream is maintained at high velocities and exits from orifices or slots on either side of the set of die orifices 14. The high-velocity air is supplied to slots from two peripheral cavities. The heated air is generally about the temperature of the polymer melt or higher (e.g., 20 to 30° C. above the melt temperature).

Figure 2:
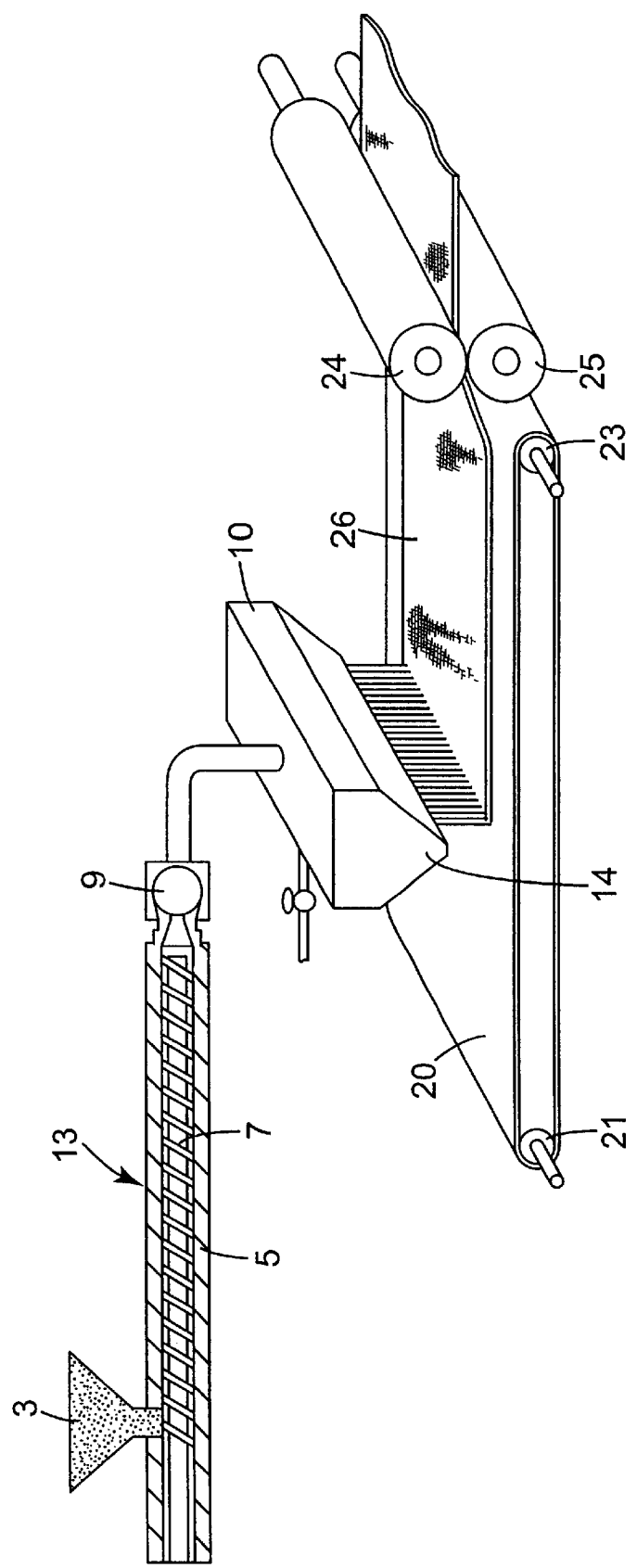
FIG. 2 is a schematic diagram of an apparatus suitable for use in forming the invention wipes.

The fibers exiting from the die orifices are attenuated by the high velocity heated air from slots and are collected on collector 20, such as a belt, at a distance a from the die. The distance a is generally from 10 to 25 cm with different preferred regions for different polymers depending on the crystalline behavior of the polymer, how rapidly it is quenched to a totally non-tacky condition or other process conditions. The collector can be a flat screen, a drum, a cylinder or a finely perforated screen belt 20 as shown in FIG. 2. Cylinders 21 and 23 drive the belt 20. A gas-withdrawal device can be located behind perforated collectors to facilitate collection of the fibers, on the screen or other perforated collector surface, as a web 26. From the collector 20, the web 26 is taken to a calender 30 where the web is consolidated under pressure, preferably from 500 to 1600 Newtons per lineal centimeter. This consolidation is advantageously carried out by calendering in the nip between two generally smooth rolls 24 and 25 (e.g., they contact each other over about 90 percent of their surface area or greater, preferably 99 percent or greater), having a Shore A durometer hardness of about 50 or more, although one roll preferably has a Shore A durometer hardness of less than about 95. The consolidated web can then be collected and subsequently converted into individual wipes.

The webs are formed of fiber-forming thermoplastic materials, which materials include, for example, polyolefins, such as polyethylene, polypropylene or polybutylene; polyesters, such as polyethylene terephthalate or polybutylene terephthalate; polyurethanes or polyamides such as nylon 6 or nylon 66. The microfibers have an average diameter of less than 10 micrometers, preferably with an average diameter of 7 micrometers or less. Smaller average fiber diameters may be obtained with smaller diameter orifices and/or by decreasing the polymer flow rate or by increasing gas withdrawal behind the collecter.

The oil absorbing wipes are formed from the consolidated film-like microfiber webs such that the wipe has a void volume of from 40 to 80 percent, preferably 45 to 75 percent and most preferably 50 to 70 percent. Where the void volume is greater than 70 percent it is difficult to obtain a rapid change in transparency or opacity as large amounts of oil are necessary to create this change, also the material becomes to compliant and difficult to handle. Where the void volume is less than 40%, the material becomes too stiff and has an insufficient capacity to absorb oil. The average pore size of the wipe is generally from 3–15 microns, preferably 3 to 12 microns and most preferably 4 to 8 microns. If the pore size is less than 3 microns, it is difficult to get the rapid oil absorption rate needed. Void volume and pore size generally can be decreased by higher consolidation conditions and/or decreasing the average fiber diameter or narrowing the range of fiber diameters. If the pore size is greater than 15 microns the ability to retain absorbed oil is lessened as is the rapid oil indicating function. Generally the void volume, basis weight and pore size should be provided to yield an oil absorption capacity of from 0.7 to 6 mg/cm$^2$, preferably 0.8 to 5 mg/cm$^2$ and most preferably 0.9 to 4 mg/cm$^2$. If the oil absorption is less than this then the capacity to absorb facial oil is insufficient for most users and when greater than these levels then the rapid oil absorption indicating function is adversely impacted for most users.

A preferred material for forming the web fibers is polypropylene wherein the desired initial and end opacity for a given wipe is controlled by the basis weight of the web forming the wipe material, the hardness of the calendering rolls, and the calendering (or consolidation) pressure and temperature. Generally, for polypropylene, a web or wipe basis weight of about 10 gm/M$^2$ to 40 gm/M$^2$ has been found suitable to provide an adequate initial transparency while allowing a change in transparency at a suitably low oil loading level with a relatively soft hand. Generally, the Hand of the wipe should be 8 grams or less, preferably 1–7 grams and most preferably 1–6 grams. The Hand, drape, or flexibility of the webs is determined using INDA Test IST 90.0-75 (R82) using a Thwing-Albert Handle-O-Meter with a 10 cm by 10 cm sample and a slot width of 1.0 cm. Generally, as drape or Hand measurements decrease the sample is more conformable. For polypropylene wipes, basis weights of greater than about 40 gm/M$^2$ are too stiff to be useful as a facial wipe. For fibers formed of other polymers or polymer blends under similar calendering conditions, different wipe basis weight ranges may be suitable depending on the oil absorbing properties and relative stiffness of the fibers forming the web.

Higher calendering temperatures and pressures have been found to have significant effects on the original transparency, pore size and void volume and also the resulting oil absorption capacity of the consolidated wipe. Higher calendering temperatures in particular significantly increase the original transparency, thus decreasing the oil-indicating value of the wipe. Under certain circumstances, it would be desirable to use chilled calendering rolls to counteract this effect. However, when a web is over-calendered (e.g., under too high a pressure and/or temperature), the web does not become more rigid, however, the oil indicating function and absorption capacity does decrease.

If the original opacity is inadequate to produce a significant enough change in opacity, opacifying agents such as silica, talc, calcium carbonate or other like inorganic powders can be used at low levels. Such powders could be coated on the surface of the wipes or incorporated into the web structures. Suitable methods for incorporating opacifying agents into the web include that taught in U.S. Pat. No. 3,971,373 where a stream of particles is entrained into two separate converging melt-blown microfiber streams prior to collection. Another method of incorporating particulates is taught in U.S. Pat. No. 4,755,178 where particles are introduced into an airstream that converges into a flow of melt-blown microfibers. Preferably, only a small amount of such opacifying agents are included as they have the tendency to detract from the wipe softness.

In addition to the above, other conventional web additives such as surfactants, colorants, and antistatic agents can be incorporated into the web by known methods.

The invention oil absorbent wipes are generally characterized by the ability to change from opaque to translucent after absorbing only a moderate amount of oil, such as would be present on a person's skin (e.g., from 0 to 8 mg/cm$^2$). The oil absorbent wipes are particularly useful as cosmetic wipes as after absorbing skin oil at the levels excreted from common sebaceous glands, they will turn translucent, thus indicating that the undesirable oil has been removed and that makeup or other skin treatments can be applied. The oil-indicating effect is provided by an oil absorbing wipe having an initial transparency of about 65 percent or less, preferably 60 percent or less with an ability to change transparency by about 10 percentage points or more, preferably 20 percentage points or more with a relatively low level of oil loading (e.g., 6 mg/cm$^2$). The effect of skin oil absorption on the transparency of the webs was measured using a Gardiner Haze Guard Plus Hazemeter following the procedure in ASTM D1003. The transparency of the webs was measured before and after oil absorption and is reported as percent (%). Transparency with a value of 0 indicates no light transmittance. Upon absorption of oil the transparency value will increase providing an indication to the user that the web has absorbed skin oil. The higher the change, the greater the indication of absorption. A change of greater than about 10 to 20 percentage points is generally needed to provide an effective indication to the user that skin oil has been absorbed. The oil absorbing wipe is generally used as a single layer of the porous filmlike material but could be laminated to other like web materials, or films or the like.

The discrete wipe materials are generally separated from one another and provided in a stacked or folded array and the like as is conventionally known for tissue-type papers. Folding can be provided by an interleaving arrangement via v-folds, z-folds or the like. With this type of folding, opposing overlapping ends of adjacent wipes assist in removal of an upper wipe to provide the lower wipe in an engagable form by frictionally pulling the lower wipe up and out through an access opening for subsequent use.

Figure 3:
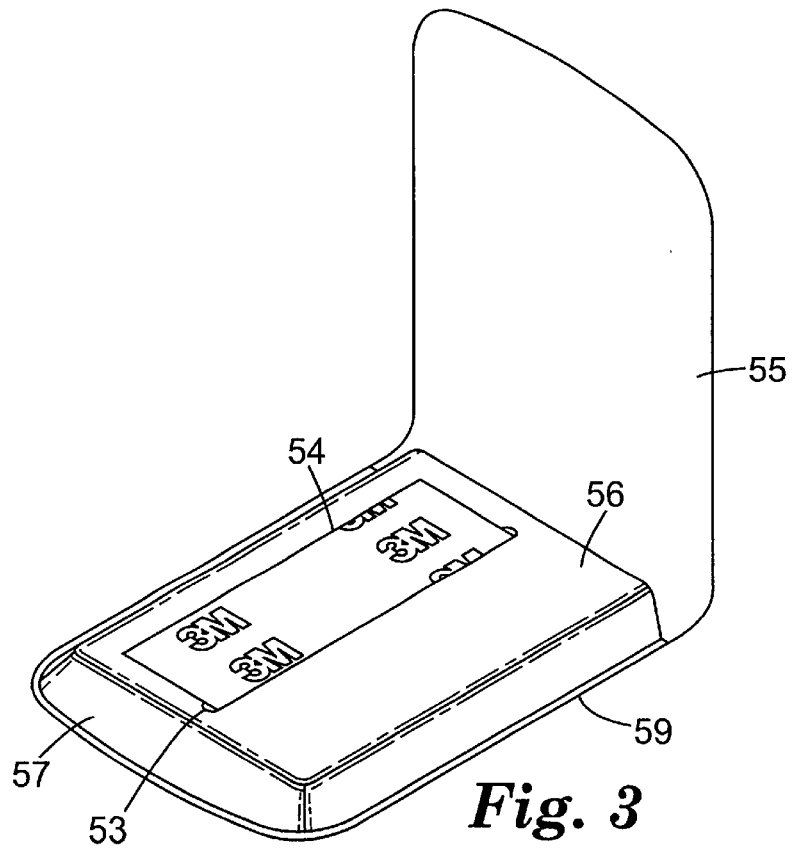
FIG. 3 is a perspective view of a dispensable package of oil absorbing wipes according to a second embodiment.

An alternative embodiment of a dispensable package arrangement for the oil absorbing wipes 54 are shown in FIG. 3, the top wall portion 56 is provided with an access opening slot 53 through which a wipe of oil absorbent wipe material is graspable. In this embodiment, the discrete wipes of wipe material must be interconnected so that the upper wipe can pull the lower wipe up and through the opening 53. This interconnection can be by separate wipes that are folded in an interleaving manner as described above. Alternatively the wipes could be separable wipes as described above; for example; separable wipes can be interconnected through a frangible connection. The movable flap 55 is provided on a sidewall portion and, like the flap in the FIG. 2 embodiment.

Figure 4:
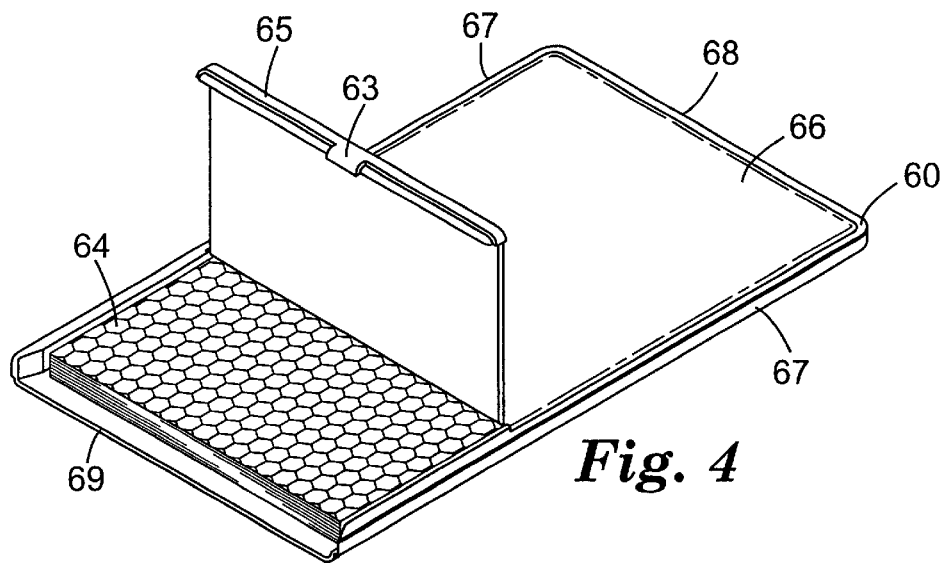
FIG. 4 is a perspective view of a dispensable package of oil absorbing wipes according to a third embodiment.

FIG. 4 shows an alternative embodiment of a dispensable package of the oil absorbent wipes formed with a rigid frame container 60, preferably plastic. The individual wipe materials 64 are contained within the container 60, which has a top wall 66 containing a movable flap 65, which is generally movable by a living hinge. A clasp 63 is provided on the outermost end of flap 65, which clasp 63 engages with the bottom wall 69 to provide for closure of the container 60. Side walls 67 contain the wipes 64 within the container 60 coupled with the upper walls 66 and lower wall 69. End wall 68 is preferably closed. In this embodiment, the individual wipes of discrete oil absorbent material would generally be stacked as separate wipes in an overlying stack preferably of coextensive wipes. The user would grasp an individual wipe and remove each one separately from the container using the frictional force of their fingers to separate the upper wipe from the immediate lower wipe. The individual wipes would then be used to remove skin oil by wiping over the user's face. Following use, the wipe is easily compacted into a small volume shape for easy disposal.

The individual discrete wipes can be of any suitable size, however, generally for most applications the wipes would have an overall surface area of from 10 to 100 cm$^2$, preferably from 20 to 50 cm$^2$. As such, the wipes would be of a size suitable for insertion in a package, which could easily be placed in the user's purse or pocket. The material forming the dispensable containers is generally not of importance and can be formed of suitable papers, plastics, paper film laminates and the like. The shape of the tissues is generally rectangular; however, other suitable shapes such as oval, circular or the like can be used.

The oil-absorbing wipes of the invention can contain or be coated with any suitable active or nonactive ingredients or agents. Additional ingredients can comprises a wide range of optional ingredients. Particularly useful are various active ingredients useful for delivering various benefits to the skin or hair during and after oil removal and cleansing.

The coating compositions can comprise a safe and effective amount of one or more pharmaceutically-acceptable active or skin modifying ingredients thereof. The term "safe and effective amount" as used herein, means an amount of an active ingredient high enough to modify the conditions to be treated or to deliver the desired skin benefit, but low enough to avoid serious side effects, at a reasonable benefit to risk ratio within the scope of sound medical judgment. What is a safe and effective amount of the active ingredient will vary with the specific active ingredient, the ability of the active ingredient to penetrate through the skin, the age, health condition, and skin condition of the user, and other like factors.

EXAMPLES

A microporous film was prepared similar to that described in PCT application WO 99/29220 Example 1, having the following composition: 5D45 polypropylene (64%, Union Carbide Co.), mineral oil (35%, white oil #31, Amoco Oil & Chemical Co.), and #7 green copper phthalocyanine pigment (1.0%, CI #74260, Sun Chemical Co.). The microporous film had a thickness of 37 microns and a void content of 30%.

Example 1

The microporous film described above was embossed by running the film into a nip formed by a steel, point-bond patterned roll and a steel, smooth backup roll. The points of the point-bond pattern were raised circular areas having a diameter of 0.6 mm. The points were spaced 2.0 mm apart (center to center) on the patterned roll. Approximately 5% of the surface area of the film was embossed with the point-bond pattern. The embossed areas on the film were relatively transparent as compared to the relatively opaque non-embossed areas resulting in a clearly visible embossed pattern. The temperature of the patterned roll was 66° C. and the temperature of the backup roll was 38° C. A nip pressure of 200 pounds per lineal inch of web width was used.

Example 2

The microporous film described above was embossed as in Example 1 except the points of the point-bond pattern were spaced 0.7 mm apart (center to center) resulting in approximately 20% of the surface area of the film being embossed. The embossed areas on the film were relatively transparent as compared to the relatively opaque non-embossed areas resulting in a clearly visible embossed pattern. A nip pressure of 50 pounds per lineal inch of web width was used.

Example 3

The microporous film described above was embossed by running the film into a nip formed by a steel, patterned roll and a steel, smooth backup roll. The patterned roll was engraved with a square mesh pattern consisting of orthogonally intersecting flat-top ridges 0.154 mm wide and 1.25 mm between intersection points. Approximately 35% of the surface area of the film was embossed with the square mesh pattern. The embossed areas on the film were relatively transparent as compared to the relatively opaque non-embossed areas resulting in a clearly visible embossed pattern. The temperature of the patterned roll was 66° C. and the temperature of the backup roll was 38° C. A nip pressure of 250 pounds per lineal inch of web width was used.

Example 4

The microporous film described above was embossed by running the film into a nip formed by a steel, patterned roll and a steel, smooth backup roll. The pattern roll was engraved with a honeycomb hexagonal pattern, the perimeter of each hexagon consisting of raised flat-top ridges having a width of 0.4 mm. The sides of each hexagon were 3.45 mm long. Approximately 15% of the surface area of the film was embossed with the hexagonal pattern. The embossed areas on the film were relatively transparent as compared to the relatively opaque non-embossed areas resulting in a clearly visible embossed pattern. The temperature of the patterned roll was 66° C. and the temperature of the backup roll was 38° C. A nip pressure of 100 pounds per lineal inch of web width was used.

Example 5

A microporous film—43 micron Aptra® Classic, obtained from BP Amoco of Atlanta, Ga., was embossed using the same pattern and conditions as Example 4 above. The embossed areas on the film were relatively transparent as compared to the relatively opaque non-embossed areas resulting in a clearly visible embossed pattern.

Example 6

A microporous film—25 micron Celgard® Flat Sheet Membrane, obtained from Celgard Inc. of Charlotte, N.C., was embossed using the same pattern and conditions as Example 4 above. The embossed areas on the film were relatively transparent as compared to the relatively opaque non-embossed areas resulting in a clearly visible embossed pattern.

Comparative Example

The non-embossed base film used in Examples 1–4 above was used as a comparative example.

Test Methods

Dispensability

To measure the ability to dispense the wipes of the present invention, the following procedure was used. The embossed film of Example 4 was cut into 52 mm by 84 mm individual sheets. The individual sheets were then assembled into a stack of 50 sheets and then inserted into the package shown in FIG. 2. A comparative control consisting of the non-embossed film of Examples 1–4 was also cut and assembled into a 50 sheet stack 52 mm by 84 mm and inserted into the same style package as shown in FIG. 2. Both packages were then manually opened and closed 50 times using the adhesive patch 43 to dispense the wipes from the package. The non-embossed film containing package exhibited 13 occasions were multiple sheets were dispensed, whereas the embossed film containing package exhibited zero occasions of multiple dispensing. The stack of embossed film wipes was 3.00 mm in height whereas the stack of non-embossed film wipes was 2.00 mm in height indicating less intimate contact between sheets resulting in improved dispensability.

I claim:

1. A package of multiple oil absorbing wipes suitable for wiping a users skin or hair, the wipes being arranged in an overlying arrangement and the wipes comprising an oil absorbing porous film-like substrate of a thermoplastic material having a transparency of less than 65 which porous substrate changes transparency when loaded with oil, said porous substrate having an embossing pattern having a higher transparency than the nonembossed portions of the wipe, over from 1 to 50 percent of at least a portion of the of the wipe material surface area which area is in contact with an adjacent wipe in the package wherein the oil absorbing wipe comprises a porous stretched film or a consolidated meltblown web of thermoplastic fibers.

2. The package of oil absorbing wipes of claim 1 wherein the embossing pattern is over from 2 to 25 percent of the embossed portion of the wipe material surface area.

3. The package of oil absorbing wipes of claim 1 wherein the embossing pattern is formed of embossing elements which are 0.1 to 10 mm wide at their narrowest dimension.

4. The package of oil absorbing wipes of claim 3 wherein the embossing elements are discrete elements.

5. The package of oil absorbing wipes of claim 3 wherein the embossing elements are connected elements.

6. The package of oil absorbing wipes of claim 1 wherein the embossed pattern has a transparency at least 10 percentage points greater than the nonembossed portion of the wipe.

7. The package of oil absorbing wipes of claim 1 wherein the embossed pattern embossing elements are 0.2 to 5 mm wide at their narrowest dimension.

8. The package of oil absorbing wipes of claim 7 wherein the wipe is embossed over substantially its entire surface.

9. The package of oil absorbing wipes of claim 1 wherein the package contains at least 2 wipes.

10. The package of oil absorbing wipes of claim 1 wherein the package contains at least 10 to 1000 wipes.

11. The package of oil absorbing wipes of claim 1 wherein the individual wipes are from 10 to 100 cm².

12. The package of oil absorbing wipes of claim 1 wherein interstitial volume per unit area of said porous stretched film is in the range of 0.0001–0.005 cm³ as calculated by the following equation:

interstitial volume per unit area=[film thickness (cm)×1 (cm)×void content (%)]/100 (where the void content is the percentage of voids in the porous film).

13. The package of oil absorbing wipes of claim 1 wherein the void content of said porous stretched film is in the range of 5–50% and the film thickness is in the range of 5–200 $\mu$m.

14. The package of oil absorbing wipes of claim 1 wherein the porous film comprises thermoplastic porous film containing from 20 to 60 percent filler.

15. The package of oil absorbing wipes of claim 14 wherein the porous film contains a non-particulate filler.

16. The package of oil absorbing wipes of claim 15 wherein the non-particulate filler is mineral oil.

17. The package of oil absorbing wipes of claim 1 wherein the porous film voids have an average size is in the range of from 0.2 to 5.0 microns ($\mu$m).

18. The package of oil absorbing wipes of claim 12 wherein the interstitial volume per unit area is from 0.0002 to 0.001 cm³.

19. The package of oil absorbing wipes of claim 1 wherein the porous oil absorbing sheet has an opacity value of about 65 or less when oil free, and which web changes transparency by at least 30 when loaded with about 6 grams or less of oil per square centimeter.

20. The oil absorbing wipe material claim 1 wherein the thermoplastic fibers are polyolefin microfibers.

21. The package of oil absorbing wipes of claim 1 wherein the thermoplastic fibers are polypropylene microfibers.

22. The package of oil absorbing wipes of claim 1 wherein the thermoplastic fibers have an average diameter of about 10 micrometers or less, and the wipe has a basis weight of about 40 gm/m² or less.

23. The package of oil absorbing wipes claim 19 wherein the wipe, when it has changed transparency, has a transparency of about 90 or greater.

24. The package of oil absorbing wipes of claim 19 wherein the web changes in transparency by 35 or more when loaded with about 6 grams or less of oil per square meter.

25. The package of oil absorbing wipes of claim 19 wherein the wipes have a void volume of from 40 to 80 percent.

26. The package of oil absorbing wipes of claim 19 wherein the wipes have a void volume of from 45 to 75 percent.

27. The package of oil absorbing wipes of claim 1 wherein the wipes have a void volume of from 50 to 70 percent.

28. The package of oil absorbing wipes of claim 1 wherein the average pore size of the wipe material is from 3 to 15 microns.

29. The package of oil absorbing wipes of claim 1 wherein the average pore size of the wipe material is from 3 to 12 microns.

30. The package of oil absorbing wipes of claim 1 wherein the average pore size of the wipe material is from 4 to 8 microns.

31. The package of oil absorbing wipes of claim 1 wherein the wipes have an oil absorption capacity of from 0.7 to 6 $mg/cm^2$.

32. The package of oil absorbing wipes of claim 1 wherein the wipes have a basis weight of from 10 to 30 $gm/m^2$.

33. The package of oil absorbing wipes of claim 1 wherein the wipes have a Hand of 8 grams or less.

34. The oil absorbing wipe material claim 1 wherein the wipes have a Hand of 1 to 6 grams or less.

* * * * *